(12) United States Patent
Liu

(10) Patent No.: US 12,405,879 B2
(45) Date of Patent: Sep. 2, 2025

(54) EXCEPTION HANDLING METHOD AND APPARATUS, DEVICE, AND STORAGE MEDIUM

(71) Applicant: Beijing Bytedance Network Technology Co., Ltd., Beijing (CN)

(72) Inventor: Hongkai Liu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 76 days.

(21) Appl. No.: 18/283,696

(22) PCT Filed: Feb. 28, 2022

(86) PCT No.: PCT/CN2022/078363
§ 371 (c)(1),
(2) Date: Sep. 22, 2023

(87) PCT Pub. No.: WO2022/206253
PCT Pub. Date: Oct. 6, 2022

(65) Prior Publication Data
US 2024/0168865 A1    May 23, 2024

(30) Foreign Application Priority Data
Mar. 29, 2021  (CN) .......................... 202110333171.6

(51) Int. Cl.
*G06F 11/362* (2025.01)
*G06F 9/455* (2018.01)

(52) U.S. Cl.
CPC ........ *G06F 11/366* (2013.01); *G06F 9/45558* (2013.01); *G06F 2009/45591* (2013.01)

(58) Field of Classification Search
CPC ............... G06F 11/366; G06F 9/45558; G06F 2009/45591; Y02D 10/00
(Continued)

(56) References Cited

U.S. PATENT DOCUMENTS 6,457,142 B1 *   9/2002   Klemm ............... G06F 11/3476
                                                              714/38.12
2005/0204341 A1   9/2005   Broussard
(Continued)

FOREIGN PATENT DOCUMENTS

CN       101794243 A     8/2010
CN       108334415 A     7/2018
(Continued)

OTHER PUBLICATIONS

Chang, Limei, "Design and Implementation of Android Mobile Application Defect Monitoring System," Thesis Submitted to Southeast University for the Professional Degree of Master of Engineering, Southeast University, Aug. 2017, 63 pages.
(Continued)

*Primary Examiner* — Yair Leibovich
(74) *Attorney, Agent, or Firm* — Astute IP Law Group

(57) ABSTRACT

The present disclosure provides an exception handling method and apparatus, a device, and a storage medium. The method comprises: acquiring, when it is determined that an exception event occurs for Java code invoked based on a JNI, a Java exception object corresponding to the exception event. Then an exception identifier corresponding to the exception event is deleted. Finally, a pre-configured Java exception handler is invoked based on the JNI, and exception handling is performed on the Java exception object using the Java exception handler, the Java exception handler being configured to report the exception event corresponding to the exception object as a Java crash event.

15 Claims, 2 Drawing Sheets

Acquire, when it is determined that an exception event occurs for a Java code invoked based on a Java Native Interface (JNI), a Java exception object corresponding to the exception event — S101

Delete an exception identifier corresponding to the exception event — S102

Invoke a pre-configured Java exception handler based on the JNI, and perform exception handling on the Java exception object using the Java exception handler — S103

(58) Field of Classification Search
USPC .................................................. 714/38.1
See application file for complete search history.

(56) References Cited

U.S. PATENT DOCUMENTS

| 2007/0234325 | A1* | 10/2007 | Bobrovsky ......... G06F 9/45516 717/148 |
| 2009/0217245 | A1 | 8/2009 | Iyer et al. |
| 2010/0287414 | A1 | 11/2010 | Pardoe et al. |

FOREIGN PATENT DOCUMENTS

| CN | 108763060 A | 11/2018 |
| CN | 111414270 A | 7/2020 |
| CN | 113032100 A | 6/2021 |

OTHER PUBLICATIONS

De Ren, Zhua Zhu Cai Hong, "JNI Exception Handling," Jul. 11, 2020 [retrieved on Apr. 24, 2022]. Retrieved from the Internet <URL:https://zhuanlan.zhihu.com/p/158727336>, 3 pages.
First Office Action and Search Report in CN202110333171.6, mailed Dec. 7, 2022, 6 pages.
International Search Report in PCT/CN2022/078363, mailed May 9, 2022, 4 pages.
Jackmego, "JNI Crash: Exception Location and Capture Processing," Jul. 6, 2018 [retrieved on Apr. 24, 2022]. Retrieved from the Internet <URL:https://www.jianshu.com/p/b6129f110e86>, 7 pages.
Jing, Dan Dan De Ning, "JNI Exception Handling," Oct. 13, 2018 [retrieved on Apr. 24, 2022]. Retrieved from the Internet <URL:https://blog.csdn.net/b1480521874/article/details/83040400>, 6 pages.
Notice of Decision of Granting Patent Right for Invention in CN202110333171.6, mailed Jun. 25, 2023, 1 page.

* cited by examiner

EXCEPTION HANDLING METHOD AND APPARATUS, DEVICE, AND STORAGE MEDIUM

CROSS-REFERENCE TO RELATED APPLICATION

This is a national stage application filed under 37 U.S.C. 371 of International Patent Application No. PCT/CN2022/078363, filed Feb. 28, 2022, which claims the priority of the Chinese patent application No. 202110333171.6, filed on Mar. 29, 2021 and titled "EXCEPTION HANDLING METHOD AND APPARATUS, DEVICE, AND STORAGE MEDIUM", the disclosures of which are incorporated herein by reference in their entireties.

TECHNICAL FIELD

The present disclosure relates to the field of data processing, in particular to an exception handling method, apparatus, device and storage medium.

BACKGROUND

Java Native Interface (JNI) is a native interface that allows Java code running on a Java virtual machine JVM to invoke native code and also allows the native code to invoke the Java code.

At present, when the native code invokes the Java code running in JVM via JNI, if an exception event occurs for the Java code, the system will not crash, but returns to the native code. In this case, if the Java code continues to be invoked, a native crash event will be considered to occur, i.e., native crash. This tends to lead to inaccurate results when developers perform aggregation analysis and other processing on this exception event subsequently based on the identified crash type.

SUMMARY

The present disclosure provides an exception handling method, apparatus, device and storage medium.

In a first aspect, the present disclosure provides an exception handling method including:
  acquiring, when it is determined that an exception event occurs for Java code invoked based on a Java Native Interface (JNI), a Java exception object corresponding to the exception event, the Java exception object characterizing the exception event;
  deleting an exception identifier corresponding to the exception event, the exception identifier characterizing that a Java virtual machine is in an exceptional working state; and
  invoking a pre-configured Java exception handler based on the JNI, and performing exception handling on the Java exception object using the Java exception handler, the Java exception handler being configured to report the exception event corresponding to the exception object as a Java crash event.

In an optional embodiment, the method further includes, before acquiring, when it is determined that the exception event occurs for the Java code invoked based on the JNI, the Java exception object corresponding to the exception event:
  determining, in response to detecting that the Java code has been invoked based on JNI, whether the exception event has occurred for the invoked Java code.

In an optional embodiment, the invoking the pre-configured Java exception handler based on the JNI, and performing exception handling on the Java exception object using the Java exception handler includes:
  invoking a predetermined Java method in a predetermined exception resolution class based on the JNI, and transmitting the Java exception object to the predetermined Java method;
  invoking the pre-configured Java exception handler using the predetermined Java method, and transmitting the Java exception object to the Java exception handler; and
  performing exception handling on the Java exception object using the Java exception handler.

In an optional embodiment, the method further includes, before the invoking the predetermined Java method in the predetermined exception resolution class based on the JNI:
  setting the predetermined exception resolution class as a global reference;
  acquiring an identifier of the predetermined Java method in the predetermined exception resolution class.

Accordingly, the invoking the predetermined Java method in the predetermined exception resolution class based on the JNI includes:
  invoking the predetermined Java method in the predetermined exception resolution class via the JNI based on the identifier of the predetermined Java method.

In a second aspect, the present disclosure provides an exception handling method including:
  receiving a Java exception object via JNI, the Java exception object characterizing an exception event occurring for invoking Java code invoked based on JNI; and
  invoking a pre-configured Java exception handler, and performing exception handling on the Java exception object using the Java exception handler, the Java exception handler being configured to report the exception event corresponding to the exception object as a Java crash event.

In a third aspect, the present disclosure provides an exception handling apparatus including:
  an acquisition module configured to acquire, when it is determined that an exception event occurs for Java code invoked based on a JNI, a Java exception object corresponding to the exception event, the Java exception object characterizing the exception event;
  a deletion module configured to delete an exception identifier corresponding to the exception event, the exception identifier characterizing that a Java virtual machine is in an exceptional working state; and
  a first exception handling module configured to invoke a pre-configured Java exception handler based on the JNI, and perform exception handling on the Java exception object using the Java exception handler, wherein the Java exception handler is configured to report the exception event corresponding to an exception object as a Java crash event.

In a fourth aspect, the present disclosure provides an exception handling apparatus including:
  a receiving module configured to receive a Java exception object via JNI, the Java exception object characterizing an exception event occurring for Java code invoked based on JNI;
  a second exception handling module configured to invoke a pre-configured Java exception handler, and perform exception handling on the Java exception object using the Java exception handler, wherein the Java exception handler is configured to report the exception event corresponding to the exception object as a Java crash event.

In a fifth aspect, the present disclosure provides a computer-readable storage medium having stored thereon instructions that, when executed on a terminal device, cause the terminal device to implement the method described above.

In a sixth aspect, the present disclosure provides a device including: a memory, a processor, and a computer program stored on the memory and executable on the processor, wherein the computer program, when executed by the processor, implements the method described above.

In a seventh aspect, the present disclosure provides a computer program product including a computer program or instruction which, when executed by a processor, implements the method described above.

BRIEF DESCRIPTION OF DRAWINGS

The accompanying drawings, which are incorporated in and constitute a part of this specification, illustrate embodiments consistent with the disclosure and, together with the description, serve to explain the principles of the disclosure.

In order to explain the embodiments of the present disclosure or the technical solutions in the related art more clearly, the following simple description will be given to the drawings which are used in the embodiments or the description of the related art. It would be obvious for a person skilled in the art to obtain other drawings according to these drawings without involving any inventive effort.

DESCRIPTION OF EMBODIMENTS

In order that the above-recited objects, features and advantages of the present disclosure may be more clearly understood, a further description of the aspects of the present disclosure is provided below. It is noted that the embodiments and features of the embodiments in the present application can be combined with each other without conflict.

In the following description, numerous specific details are set forth in order to provide a thorough understanding of the present disclosure, but the present disclosure may be practiced otherwise than as specifically described herein. Apparently, the embodiments in the description are only a few embodiments but not all embodiments of the present disclosure.

An Java Native Interface (JNI) allows Java code to interact with code written in other languages. When native code invokes Java code via JNI, if an exception occurs for the Java code, the exception should be considered as a Java crash event in theory. However, at present, the exception event occurring for the Java code under the above-mentioned scenario is erroneously considered as a native crash event. As a result problems such as inaccuracy tend to arise when subsequent aggregation analysis of exception events is performed based on the erroneous identification.

In view of this, embodiments of the present disclosure provide an exception handling method, where a Java exception handler is invoked to process an exception event occurring for Java code, so that the exception event occurring for the Java code in the above-mentioned scenario can be reported as a Java crash event, thereby improving the accuracy of a subsequent aggregation analysis result of exception events.

Specifically, when it is determined that an exception event occurs for Java code invoked based on a JNI, a Java exception object corresponding to an exception event is acquired, the Java exception object characterizing the exception event. Then an exception identifier corresponding to the exception event is deleted, the exception identifier characterizing that a Java virtual machine is in an exceptional working state. Finally a pre-configured Java exception handler is invoked based on the JNI, and exception handling is performed on the Java exception object using the Java exception handler, the Java exception handler being configured to report the exception event corresponding to the exception object as a Java crash event.

Figure 1:
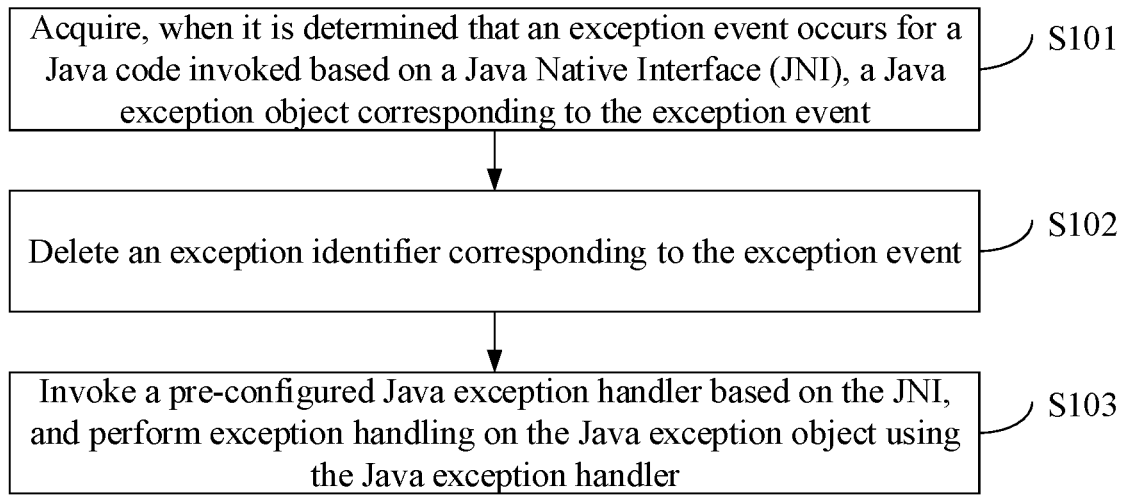
FIG. 1 is a flowchart of an exception handling method according to an embodiment of the present disclosure.

Based on this, an embodiment of the present disclosure provides an exception handling method. Referring to FIG. 1, a flow chart of an exception handling method according to an embodiment of the present disclosure is illustrated. The method includes the following operations.

S101 when it is determined that an exception event occurs for Java code invoked based on a Java Native Interface (JNI), a Java exception object corresponding to the exception event is acquired. The Java exception object characterizes the exception event.

The exception handling method according to an embodiment of the present disclosure is applied to a native layer, namely, native code. In particular, when it is determined that an exception event occurs for Java code invoked based on a JNI, a Java exception object corresponding to the exception event is first acquired. The Java exception object contains event information about the exception event, for example, an exception event occurring event, an event feature, etc.

In an optional embodiment, in response to detecting that the Java code has been invoked based on JNI, it is determined whether an exception event has occurred for the invoked Java code. That is, it is checked whether an exception event occurs after invoking any Java method in the JNI code.

In an optional embodiment, it may be checked whether an exception event occurs for the invoked Java code via a CheckException function. If it is determined that no exception event occurs, it is adequate to just return the examination result; and if it is determined that an exception event occurs for the invoked Java code, the currently thrown Java exception object can be acquired through an ExceptionOccurred function, and recorded as throwable.

S102: an exception identifier corresponding to the exception event is deleted.

The exception identifier is used for characterizing that a Java virtual machine is in an exceptional working state.

According to an embodiment of the present disclosure, after it is determined that an exception event occurs for the Java code invoked based on the JNI, an exception identifier corresponding to the exception event may also be deleted.

In practice, when an exception event occurs for the Java code running on the Java virtual machine, an exception identifier is marked for the exception event to characterize that the Java virtual machine is in an exceptional working state. In order to restore the Java virtual machine to a normal operating state for subsequent handling of an exception with the Java virtual machine, according to an embodiment of the present disclosure, an exception identifier used to characterize that the Java virtual machine is in an exceptional operating state is deleted.

In an optional embodiment, the ExceptionClear function can be invoked to clear the current exception identifier. Specifically, the purpose of clearing the current exception identifier is that the Java code can continue to be invoked subsequently.

S103: a pre-configured Java exception handler is invoked based on the JNI, and exception handling is performed on the Java exception object using the Java exception handler. The Java exception handler is configured to report the exception event corresponding to the exception object as a Java crash event.

According to an embodiment of the present disclosure, after deleting the exception identifier and acquiring the Java exception object, a predetermined Java exception handler is invoked based on the JNI. Since the Java exception handler is used for reporting an exception event corresponding to an exception object as a Java crash event, according to an embodiment of the present disclosure, the Java exception object can be processed by invoking the Java exception handler, so that the exception event corresponding to the Java exception object can be reported as the Java crash event.

In an optional embodiment, a predetermined Java method in a predetermined exception resolution class can be invoked based on JNI, and a Java exception object is transferred to the predetermined Java method; a predetermined Java exception handler is invoked using the predetermined Java method; the Java exception object is transferred to the Java exception handler; the Java exception handler is used to perform exception handling on the Java exception object; and an exception event corresponding to the Java exception object is reported as a Java crash event.

In practice, in order to enable other threads to also use the reference to the JNIExceptionHelper class, the predetermined exception resolution class can be set as a global reference. In addition, in order that other threads can also invoke the predetermined Java method in the predetermined exception resolution class subsequently, an identifier of the predetermined Java method in the predetermined exception resolution class can be acquired in advance to subsequently invoke the same based on the identifier.

In an optional embodiment, the JNIExecptionHelper class may be predefined as a predetermined exception resolution class, and the handleJNIException method may be declared in the JNIExecptionHelper class as a predetermined Java method in the predetermined exception resolution class.

In addition, a native method named init, i.e. the init method, is also declared in the JNIExecptionHelper class. In the initialization stage, the init method in the JNIExecption-Helper class can be invoked, whereby the native layer reference to the JNIExecptionHelper class is converted into a global reference through the NewGlobalRef function, and recorded and saved as clz, so that the handleJNIException method of the JNIExecptionHelper class can be invoked in other threads.

In addition, in an embodiment of the present disclosure, the GetStaticMethodID function may also be invoked to get the id of the handleJNIException method and save it as midHandleJNIException.

In practice, based on the saved midHandleJNIException, a handleJNIException method in a JNIExecptionHelper class can be invoked via JNI, so that the handleJNIException method is used to invoke a pre-configured Java exception handler, and after the Java exception object is transferred to the Java exception handler, the Java exception handler performs exception handling on the Java exception object to report an exception event corresponding to the Java exception object as a Java crash event.

In the exception handling method according to the embodiment of the present disclosure, when it is determined that an exception event occurs for Java code invoked based on a JNI, a Java exception object corresponding to an exception event is acquired, the Java exception object characterizing the exception event. Then an exception identifier corresponding to the exception event is deleted, the exception identifier characterizing that a Java virtual machine is in an exceptional working state. Finally a pre-configured Java exception handler is invoked based on the JNI, and exception handling is performed on the Java exception object using the Java exception handler, the Java exception handler being configured to report the exception event corresponding to the exception object as a Java crash event. According to the embodiment of the present disclosure, an exception event occurring for Java code is handled by invoking a Java exception handler, so that the exception event occurring for the Java code in the above-mentioned scenario can be reported as a Java crash event, thereby improving the accuracy of a subsequent aggregation analysis result of exception events.

Figure 2:
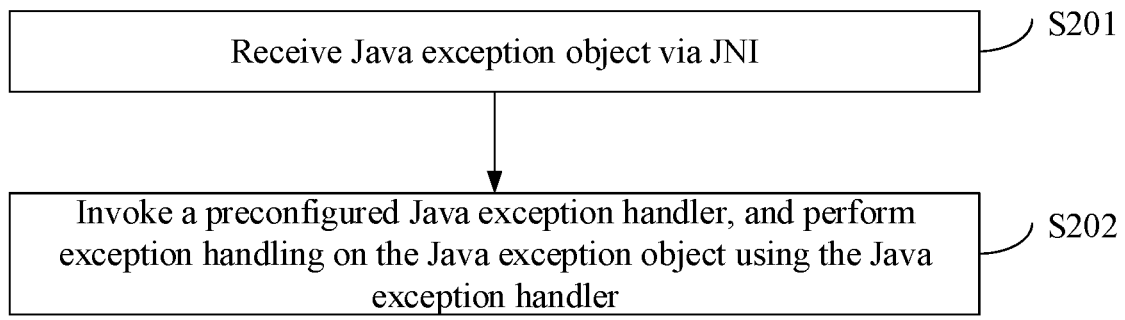
FIG. 2 is a flowchart of another exception handling method according to an embodiment of the present disclosure.

Based on the above-mentioned embodiments, embodiments of the present disclosure also provide an exception handling method. Referring to FIG. 2, a flow chart of another exception handling method according to an embodiment of the present disclosure is illustrated. The method is applied to a Java layer, i.e., Java code. Specifically, the method includes the following operations.

S201: a Java exception object is received via JNI.

The Java exception object is used for characterizing an exception event occurring for Java code invoked based on a JNI.

According to an embodiment of the present disclosure, after an exception event occurs for Java code invoked based on the JNI, a Java exception object corresponding to the exception event can be received through the JNI for subsequent processing of the exception event.

In an optional embodiment, the handleJNIException method in the JNIExecptionHelper class may receive the Java exception object, throwable, via JNI and record the throwable as jthrowable.

S202: a pre-configured Java exception handler is invoked, and exception handling is performed on the Java exception object using the Java exception handler, the Java exception handler being configured to report the exception event corresponding to the exception object as a Java crash event.

According to an embodiment of the present disclosure, after the jthrowable is acquired by the handleJNIException method in the NIExecptionHelper class, the current Java exception handler, i.e., the predetermined Java exception handler in the embodiments of the present disclosure denoted as currentHandler, can be acquired through the getDefaultUncaughtExceptionHandler method of the Thread class.

In practice, it is first determined whether the currentHandler is null. If it is null, it indicates that the current currentHandler is unavailable. If it is not null, the uncaughtException method of the currentHandler can be invoked, and the current thread object and the jthrowable acquired by invoking the currentThread method of the Thread class are passed as parameters to the uncaughtException method of the currentHandler for realizing exception handling on the jthrowable.

Since currentHandler is a Java exception handler registered by Java crash monitor program by default at startup, handling an exception event with currentHandler will report the exception event as a Java crash event. Specifically, by invoking the uncaughtException method of currentHandler, the Java crash monitor program can be notified that a Java crash event currently occurs, and then crash information can be collected, and the collected crash information can be reported at an appropriate time for analysis of this Java crash event.

Figure 3:
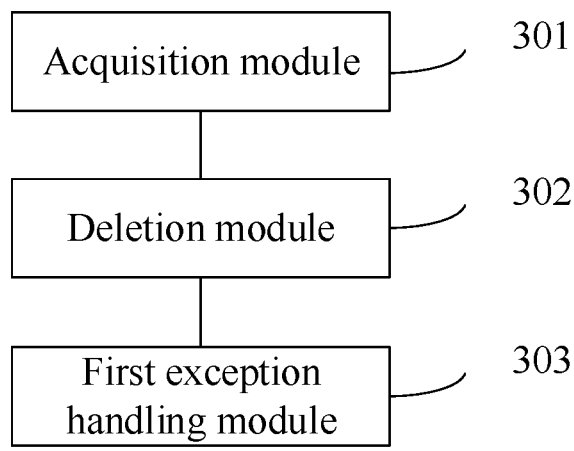
FIG. 3 is a schematic structural diagram of an exception handling apparatus according to an embodiment of the present disclosure.

Based on the above-mentioned method embodiments, the present disclosure also provides an exception handling apparatus. Referring to FIG. 3, a schematic structural diagram of an exception handling apparatus according to an embodiment of the present disclosure is illustrated. The apparatus including:

an acquisition module 301 configured to acquire, when it is determined that an exception event occurs for Java code invoked based on a JNI, a Java exception object corresponding to the exception event, the Java exception object characterizing the exception event;

a deletion module 302 configured to delete an exception identifier corresponding to the exception event, the exception identifier characterizing that a Java virtual machine is in an exceptional working state; and a first exception handling module 303 configured to invoke a pre-configured Java exception handler based on the JNI, and perform exception handling on the Java exception object using the Java exception handler, wherein the Java exception handler is configured to report the exception event corresponding to the exception object as a Java crash event.

In an optional embodiment, the apparatus further includes: a determination module configured to determine, in response to detecting that the Java code has been invoked based on JNI, whether the exception event has occurred for the invoked Java code.

In an optional embodiment, the first exception handling module includes:

a first transmission sub-module configured to invoke a predetermined Java method in a predetermined exception resolution class based on the JNI, and transmit the Java exception object to the predetermined Java method;

a second transmission sub-module configured to invoke the pre-configured Java exception handler using the predetermined Java method, and transmit the Java exception object to the Java exception handler; and a first exception handling sub-module configured to perform exception handling on the Java exception object using the Java exception handler.

In an optional embodiment, the first exception handling module includes:

a setting sub-module configured to set the predetermined exception resolution class as a global reference;

an acquisition sub-module configured to acquire an identifier of the predetermined Java method in the predetermined exception resolution class.

Accordingly, the first transmission sub-module is specifically configured to: invoke the predetermined Java method in the predetermined exception resolution class via the JNI based on the identifier of the predetermined Java method.

Figure 4:
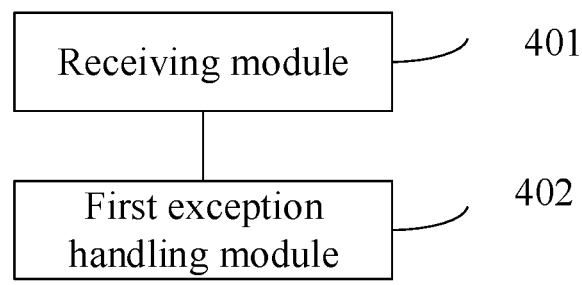
FIG. 4 is a schematic structural diagram of another exception handling apparatus according to an embodiment of the present disclosure.

On the basis of the above-mentioned embodiments, the present disclosure also provides another exception handling apparatus. Referring to FIG. 4, a schematic structural diagram of another exception handling apparatus according to an embodiment of the present disclosure is illustrated. The apparatus includes:

a receiving module 401 configured to receive a Java exception object via JNI, the Java exception object characterizing an exception event occurring for Java code invoked based on JNI;

a second exception handling module 402 configured to invoke a pre-configured Java exception handler, and perform exception handling on the Java exception object using the Java exception handler, wherein the Java exception handler is configured to report the exception event corresponding to an exception object as a Java crash event.

For the exception handling apparatus according the an embodiment of the present disclosure, when it is determined that an exception event occurs for Java code invoked based on a JNI, a Java exception object corresponding to the exception event is acquired, the Java exception object characterizing the exception event. Then an exception identifier corresponding to the exception event is deleted, the exception identifier characterizing that a Java virtual machine is in an exceptional working state. Finally a pre-configured Java exception handler is invoked based on the JNI, and exception handling is performed on the Java exception object using the Java exception handler, the Java exception handler being configured to report the exception event corresponding to the exception object as a Java crash event. By invoking a Java exception handler to process an exception event occurring for Java code, the embodiment of the present disclosure can report the exception event occurring for the Java code in the above-mentioned scenario as a Java crash event, thus improving the accuracy of a subsequent aggregation analysis result of exception events.

In addition to the method and apparatus described above, embodiments of the present disclosure also provide a computer-readable storage medium having stored thereon instructions that, when executed on a terminal device, cause the terminal device to implement the exception handling method of embodiments of the present disclosure.

Embodiments of the present disclosure also provide a computer program product including a computer-program/instructions that, when executed by a processor, implements the exception handling method of embodiments of the present disclosure.

Figure 5:
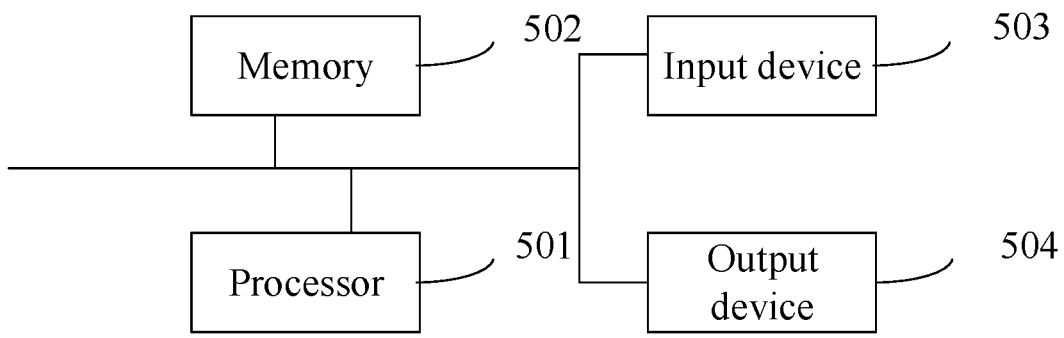
FIG. 5 is a schematic structural diagram of an exception handling apparatus according to an embodiment of the present disclosure.

In addition, an embodiment of the present disclosure also provides an exception handling apparatus, which may include: a processor 501, a memory 502, an input device 503 and an output device 504. The number of processors 501 in the exception handling apparatus may be one or more, with one processor being exemplified in FIG. 5. In some embodiments of the present disclosure, the processor 501, the memory 502, the input device 503, and the output device 504 may be connected via a bus or otherwise, wherein the connection via a bus is exemplified in FIG. 5.

The memory 502 may be used to store software programs and modules, and the processor 501 executes various functional applications of the exception handling apparatus and data processing by running the software programs and modules stored in the memory 502. The memory 502 may mainly include a storage program area and a storage data area, wherein the storage program area may store an operating system, an application program required for at least one function, and the like. In addition, the memory 502 may include a high-speed random-access memory and may also include a non-volatile memory, such as at least one magnetic disk storage device, flash memory device, or other non-volatile solid state storage devices. The input device 503 may be used to receive input numeric or character information and to generate signal inputs related to user settings and functional controls of the exception handling apparatus.

In particular, in the present embodiment, the processor 501 loads executable files corresponding to processes of one or more application programs into the memory 502 according to the following instructions, and the processor 501 runs the application programs stored in the memory 502, thereby realizing various functions of the above-mentioned exception handling apparatus.

It is noted that relational terms such as first and second, and the like, may be used herein to distinguish one entity or action from another entity or action without necessarily requiring or implying any actual such relationship or order between such entities or actions. Further, the terms "include", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by the phrase "includes a . . . " does not, without more constraints, preclude the existence of additional identical elements in the process, method, article, or apparatus that includes the element.

The previous description of the disclosed embodiments is provided to enable any person skilled in the art to make or use the present disclosure. Various modifications to these embodiments will be readily apparent to a person skilled in the art, and the generic principles defined herein may be implemented in other embodiments without departing from the spirit or scope of the present application. Thus, the present application is not intended to be limited to the embodiments shown herein but is to be accorded the widest scope consistent with the principles and novel features disclosed herein.

What is claimed is:

1. An exception handling method, comprising:
   acquiring, when it is determined that an exception event occurs for Java code invoked based on a Java Native Interface (JNI), a Java exception object corresponding to the exception event, the Java exception object characterizing the exception event;
   deleting an exception identifier corresponding to the exception event, the exception identifier characterizing that a Java virtual machine is in an exceptional working state; and
   invoking a pre-configured Java exception handler based on the JNI, and performing exception handling on the Java exception object using the pre-configured Java exception handler, the pre-configured Java exception handler being configured to report the exception event corresponding to the Java exception object as a Java crash event.

2. The method according to claim 1, further comprising, prior to acquiring, when it is determined that the exception event occurs for the Java code invoked based on the JNI, the Java exception object corresponding to the exception event:
   determining, in response to detecting that the Java code has been invoked based on the JNI, whether the exception event has occurred for the invoked Java code.

3. The method according to claim 1, wherein the invoking the pre-configured Java exception handler based on the JNI and performing exception handling on the Java exception object using the pre-configured Java exception handler comprises:
   invoking a predetermined Java method in a predetermined exception resolution class based on the JNI, and transmitting the Java exception object to the predetermined Java method;
   invoking the pre-configured Java exception handler using the predetermined Java method, and transmitting the Java exception object to the pre-configured Java exception handler; and
   performing exception handling on the Java exception object using the pre-configured Java exception handler.

4. The method according to claim 3, further comprising, prior to invoking the predetermined Java method in the predetermined exception resolution class based on the JNI:
   setting the predetermined exception resolution class as a global reference; and
   acquiring an identifier of the predetermined Java method in the predetermined exception resolution class,
   wherein the invoking the predetermined Java method in the predetermined exception resolution class based on the JNI comprises:
   invoking the predetermined Java method in the predetermined exception resolution class via the JNI based on the identifier of the predetermined Java method.

5. A non-transitory computer-readable storage medium, having instructions stored thereon, the instructions, when executed on a terminal device, causing the terminal device to implement the exception handling method according to claim 1.

6. The non-transitory computer-readable storage medium according to claim 5, wherein the exception handling method further comprises, prior to acquiring, when it is determined that the exception event occurs for the Java code invoked based on the JNI, the Java exception object corresponding to the exception event:
   determining, in response to detecting that the Java code has been invoked based on the JNI, whether the exception event has occurred for the invoked Java code.

7. The non-transitory computer-readable storage medium according to claim 5, wherein the invoking the pre-configured Java exception handler based on the JNI and performing exception handling on the Java exception object using the pre-configured Java exception handler comprises:
   invoking a predetermined Java method in a predetermined exception resolution class based on the JNI, and transmitting the Java exception object to the predetermined Java method;
   invoking the pre-configured Java exception handler using the predetermined Java method, and transmitting the Java exception object to the pre-configured Java exception handler; and
   performing exception handling on the Java exception object using the pre-configured Java exception handler.

8. The non-transitory computer-readable storage medium according to claim 7, wherein the exception handling method further comprises, prior to invoking the predetermined Java method in the predetermined exception resolution class based on the JNI:

setting the predetermined exception resolution class as a global reference; and acquiring an identifier of the predetermined Java method in the predetermined exception resolution class, wherein the invoking the predetermined Java method in the predetermined exception resolution class based on the JNI comprises:

invoking the predetermined Java method in the predetermined exception resolution class via the JNI based on the identifier of the predetermined Java method.

9. An exception handling method, comprising:

receiving a Java exception object via a Java Native Interface (JNI), the Java exception object characterizing an exception event occurring for Java code invoked based on the JNI; and invoking a pre-configured Java exception handler, and performing exception handling on the Java exception object using the pre-configured Java exception handler, the pre-configured Java exception handler being configured to report the exception event corresponding to the Java exception object as a Java crash event.

10. A non-transitory computer-readable storage medium, having instructions stored thereon, the instructions, when executed on a terminal device, causing the terminal device to implement the method according to claim 9.

11. An electronic device, comprising: a memory, a processor, and a computer program stored on the memory and executable on the processor, wherein the computer program, when executed by the processor, performs the method according to claim 9.

12. An electronic device, comprising: a memory, a processor, and a computer program stored on the memory and executable on the processor, wherein the computer program, when executed by the processor, performs an exception handling method, comprising:

acquiring, when it is determined that an exception event occurs for Java code invoked based on a Java Native Interface (JNI), a Java exception object corresponding to the exception event, the Java exception object characterizing the exception event;

deleting an exception identifier corresponding to the exception event, the exception identifier characterizing that a Java virtual machine is in an exceptional working state; and invoking a pre-configured Java exception handler based on the JNI, and performing exception handling on the Java exception object using the pre-configured Java exception handler, the pre-configured Java exception handler being configured to report the exception event corresponding to the Java exception object as a Java crash event.

13. The electronic device according to claim 12, wherein the exception handling method further comprises, prior to acquiring, when it is determined that the exception event occurs for the Java code invoked based on the JNI, the Java exception object corresponding to the exception event:

determining, in response to detecting that the Java code has been invoked based on the JNI, whether the exception event has occurred for the invoked Java code.

14. The electronic device according to claim 12, wherein the invoking the pre-configured Java exception handler based on the JNI and performing exception handling on the Java exception object using the pre-configured Java exception handler comprises:

invoking a predetermined Java method in a predetermined exception resolution class based on the JNI, and transmitting the Java exception object to the predetermined Java method;

invoking the pre-configured Java exception handler using the predetermined Java method, and transmitting the Java exception object to the pre-configured Java exception handler; and performing exception handling on the Java exception object using the pre-configured Java exception handler.

15. The electronic device according to claim 14, wherein the exception handling method further comprises, prior to invoking the predetermined Java method in the predetermined exception resolution class based on the JNI:

setting the predetermined exception resolution class as a global reference; and acquiring an identifier of the predetermined Java method in the predetermined exception resolution class, wherein the invoking the predetermined Java method in the predetermined exception resolution class based on the JNI comprises:

invoking the predetermined Java method in the predetermined exception resolution class via the JNI based on the identifier of the predetermined Java method.

* * * * *